Feb. 27, 1973   M. O. COLEMAN ET AL   3,718,529
PICTURE AND METHOD OF MAKING SAME
Filed May 24, 1971   2 Sheets-Sheet 1

INVENTORS
MARGOT O. COLEMAN
ELIZABETH W. JOHNSON

BY
Wilkinson, Mawhinney & Theibault
ATTORNEYS

Feb. 27, 1973     M. O. COLEMAN ET AL     3,718,529

PICTURE AND METHOD OF MAKING SAME

Filed May 24, 1971     2 Sheets-Sheet 2

INVENTORS
MARGOT O. COLEMAN
ELIZABETH W. JOHNSON

BY
Wilkinson Mawhinney & Theibault
ATTORNEYS

United States Patent Office 3,718,529
Patented Feb. 27, 1973

3,718,529
PICTURE AND METHOD OF MAKING SAME
Margot O. Coleman, 10100 SW. 56th Ave. 33156, and Elizabeth W. Johnson, 4780 Pine Drive 33143, both of Miami, Fla.
Filed May 24, 1971, Ser. No. 146,100
Int. Cl. A01n 3/00; A41g 1/00; B44f 7/00
U.S. Cl. 161—19
6 Claims

ABSTRACT OF THE DISCLOSURE

Natural flowers, foliage and/or plants, fresh or dried are grouped in an attractive arrangement on a backing sheet of paper or the like in which the sheet should be impervious to water and shrinkage and the material pressed as flat as possible against the sheet and glued thereto if desired, after which a sheet of silk tissue paper or the like is placed over the pressed material and painted over with a clear white water-diluted glue followed by brushing all possible wrinkles, when dry a coat of decoupage is applied providing either a glossy or flat finish. Acrylic paints are then applied, simulating the color of the actual material as closely as possible; and finally, when dry, a final coating of acrylic gel is applied.

---

The present invention relates to pictures and method of making same and has for an object to produce pictures, without oils, which, when finished, will have the appearance, and can be treated the same, as oil paintings.

For instance, pictures made in the technique according to the invention can be framed without glass covers which enables dusting of the actual picture similarly to dusting of oil paintings.

The invention has for a further object the production of pictures from actual foliage and flowers of plants so as to capture the naturalness of the subjects in a manner most pleasing to the beholder.

A still further object of the invention is to produce from choice living floral displays, pictures possessing genuine naturalness and at the same time perennial life preserved in prime condition at all times.

With the foregoing and other objects in view, the invention will be more fully described hereinafter, and will be more particularly pointed out in the claims appended hereto.

In the drawings, wherein like symbols refer to like or corresponding parts throughout the several views.

Figure 3:
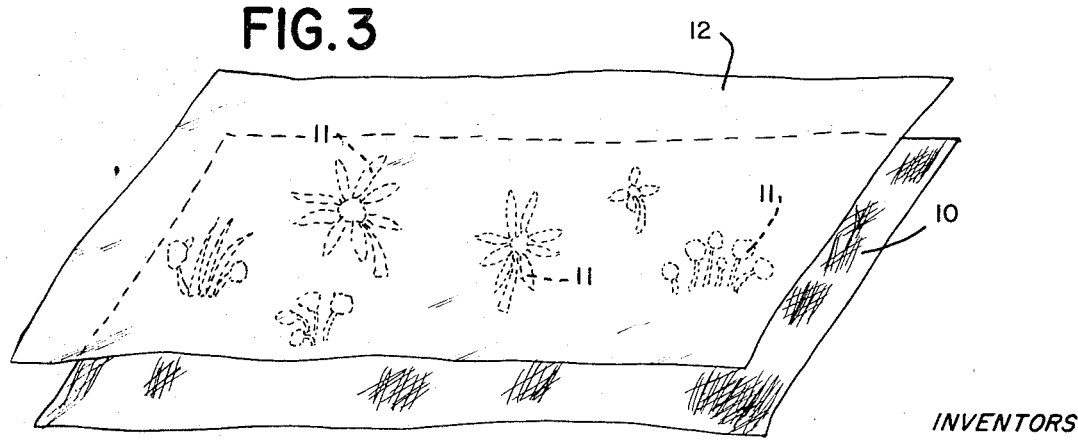
Figure 4:
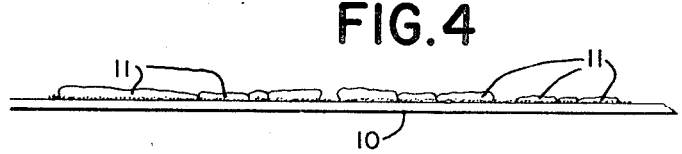
Figure 5:
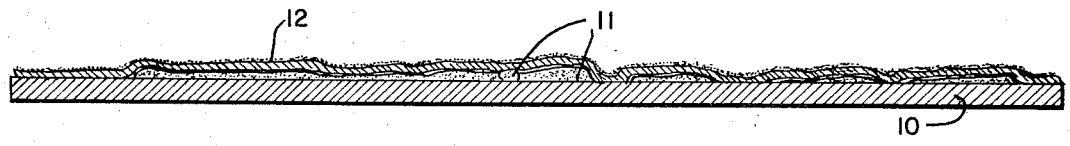

FIG. 3 illustrates the third step of the process, namely that of applying a cover sheet of silk tissue paper or the like over the arrangement of plants, foliage, flowers, etc., FIG. 4 is a framentary edge view of the backing sheet showing an asembled arrangement of the flowers, foliage and plants thereon, FIG. 5 is an edge view of the backing sheet with the silk cover sheet showing in section as conforming to the picture material assembled on the backing sheet.

Figure 6:
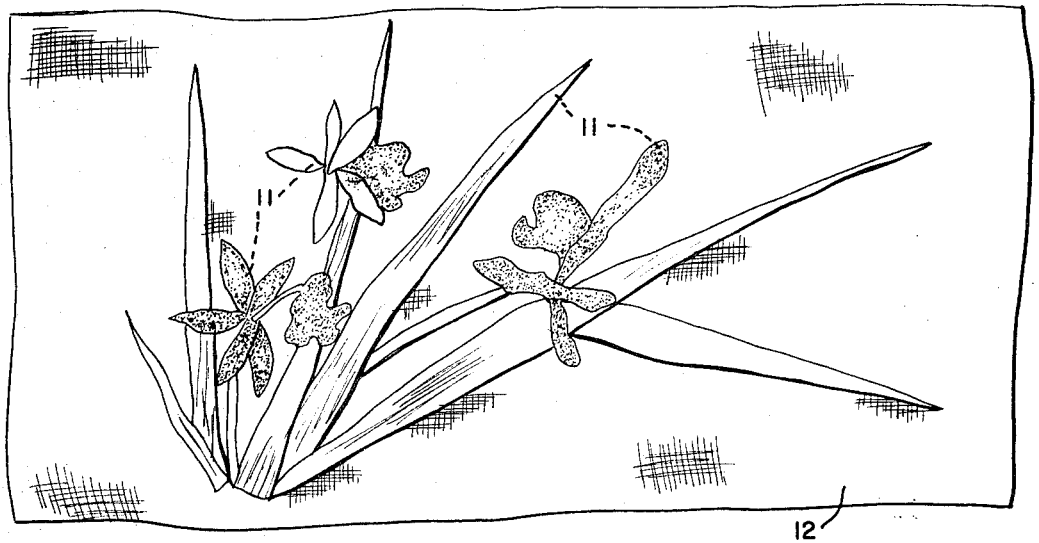

FIG. 6 is a plan view of the arrangement shown in FIG. 5, and

Figure 7:
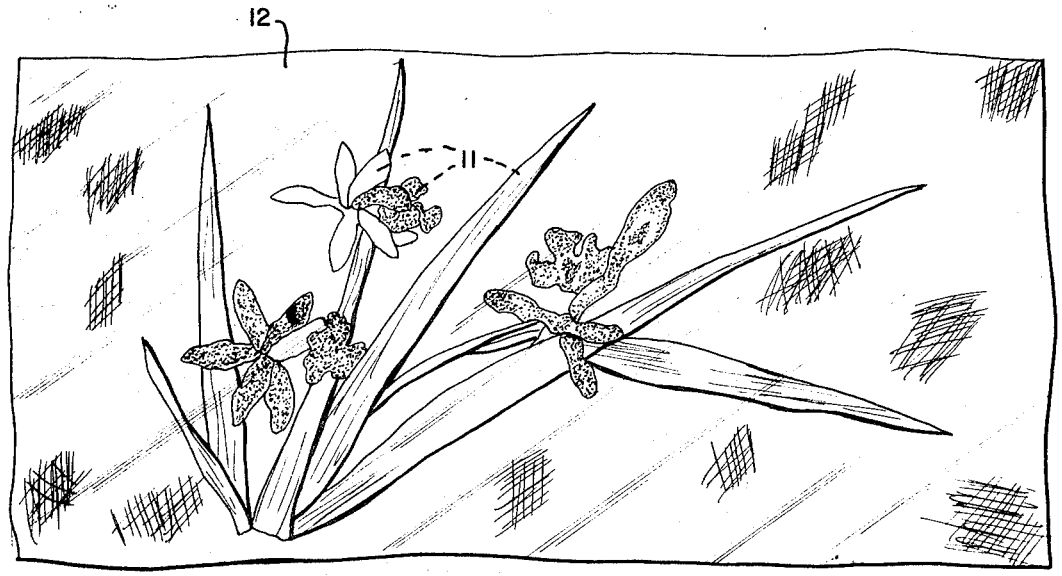

FIG. 7 is a similar plan view after coloring or painting in natural colors the flowers, foliage and plant materials.

Figure 1:
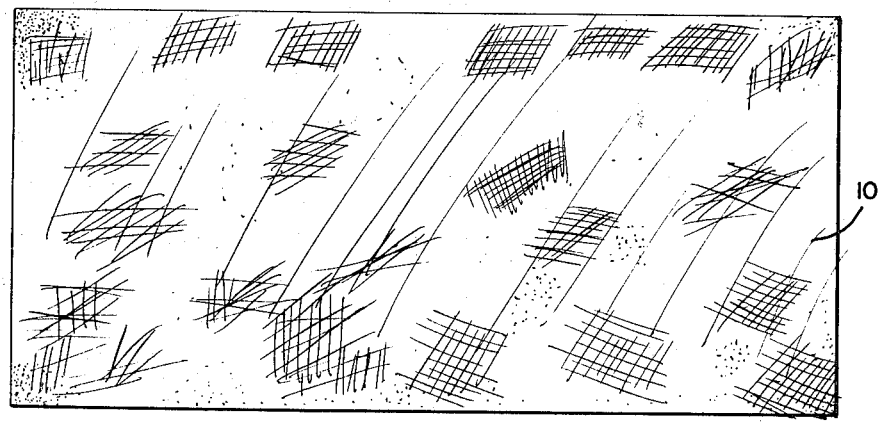
FIG. 1 is a plan view of a form of backing sheet employed.
Figure 2:
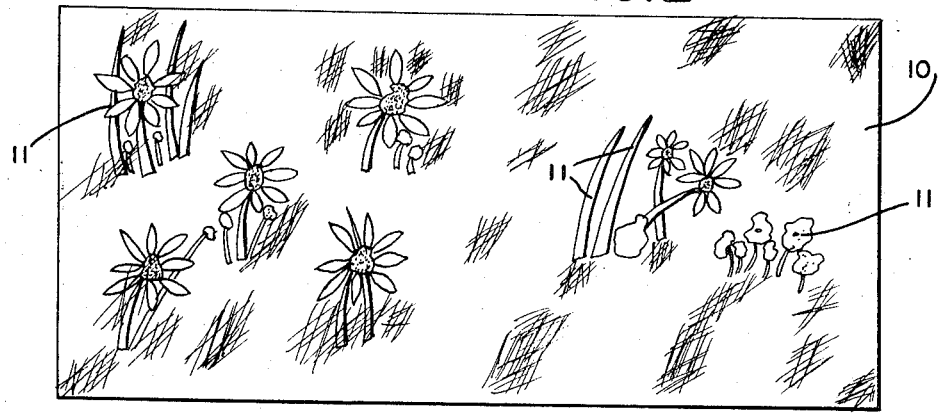
FIG. 2 is a similar view showing the second step in the process, namely that of having placed the flowers, foilage and plants on the backing sheet in an attractive arrangement.

Referring more particularly to the drawings 10 designates a backing sheet of preferably rather heavy though flexible paper board or other suitable material as shown individually in FIG. 1 onto which natural flowers, foliage, plants, fresh or dried, or the like are placed in an attractive arrangement, such material being indicated by the numeral 11 in FIG. 2.

The glass fibre paper 10 should be impervious to warping or shrinkage. The plant material should be pressed as flat as practicable against the backing sheet 10.

When the final arrangement is decided, the plant material should preferably be glued or otherwise affixed to the paper or backing sheet 10.

As shown in FIG. 3 an enclosing transparent sheet 12 is thereupon placed over the floral arrangement as affixed to the backing sheet 10, this sheet 12 being preferably of transparent silk tissue paper.

The enclosing sheet 12 is then glued to the backing sheet 10 over the floral arrangement 11. Any clear glue is adaptable. However, such clear glue is preferably first diluted to one-third glue to two-thirds water. Such diluted glue is painted over the silk tissue 12 covering the floral arrangement. The glue will soak through the transparent silk tissue 12 covering the arrangement.

Immediately after application of the diluted transparent glue the silk tissue covering is smoothed with a brush to eliminate all possible wrinkles.

The diluted glue is thereupon permitted to dry, after which a coat of liquid finishing material is applied over the silk tissue paper 12 and the dried glue coating. Such liquid finishing material is preferably a decoupage. A number of brands of such decoupage are available on the market and all are apparently good for this purpose, providing either a glossy or flat finish as desired.

Acrylic paints are then applied over the thus treated silk tissue paper 12, simulating the color of the actual floral and plant elements.

After the paint is dry a final coating of fixing material is applied over the whole area of the sheets 10 and 12. This fixing material may be an acrylic gel, of which several brands are available on the market.

The above described process and picture is adaptable to many objects and surfaces, such as the decoration of boxes, pocketbooks, murals. The possibilities are unlimited.

The silk tissue 12 is sufficiently porous to permit the glue to pass through all areas of such tissue 12 and adhere to the backing sheet 10.

The backing sheet 10 recommended is called Scintilla, a multi-purpose paper and is made of fibre glass with a textured appearance. However, the process can be carried out with other papers. A paper impervious to shrinkage is preferable and Scintilla is such a paper.

The decoupage clarifies the plant material below the silk tissue and provides a good surface for the acrylic paints. It also contributes with the acrylic gel, to the appearance of an oil painting when completed. In this respect the decoupage can be termed a "finishing material."

The paints do not have to be acrylic. The reason the acrylics are excellent is because they do not smear when the finishes are applied, versus, for instance, water color paints.

The acrylic gel can be termed a fixing material that adds depth and protection.

What we claim is:

1. The method of picture making comprising placing on a translucent fibre glass backing sheet an attractive arrangement of natural plant material, superimposing a sheet of thin transparent porous covering material over the plant material and backing sheet, applying a substantially clear diluted acrylic glue over the thin covering material, smoothing the surface of the covering material to remove wrinkles, applying a coat of acrylic finishing material to the thus treated surface, and applying over the natural plant material acrylic paints in colors simulating the colors of the natural plant material.

2. The method of picture making as claimed in claim 1 in which the natural plant material comprises natural flowers and accompanying foliage.

3. The method of picture making as claimed in claim 1 in which the plant material is fresh or dried.

4. The method of picture making as claimed in claim 1 in which the thin covering material is of silk tissue paper.

5. The method of picture making as claimed in claim 1 further comprising pressing the plant material flat against the backing sheet prior to application of the thin covering material.

6. A picture comprising a translucent fibre glass backing sheet impervious to warp and shrinkage, natural plant material affixed in an attractive arrangement to said backing sheet, a silk tissue covering sheet over the backing sheet and said arrangement and adhered thereto with acrylic adhesive, an application of acrylic paint to the sheet in colors natural to the flowers and foliage, an acrylic coating of fixing material over the application of said acrylic paint, and a final acrylic finish coating over the composite picture.

References Cited
UNITED STATES PATENTS

| | | | |
|---|---|---|---|
| 1,459,715 | 6/1923 | Bliss | 161—3 |
| 1,513,259 | 10/1924 | Miyata | 161—1 |
| 3,427,176 | 2/1969 | Moriya | 161—19 X |

J. H. STEINBERG, Primary Examiner

U.S. Cl. X.R.

161—21; 156—57